OPTICAL SCANNING SYSTEM FOR TRANSFER OF SELECTED COLOR PATTERNS
Filed Feb. 13, 1967
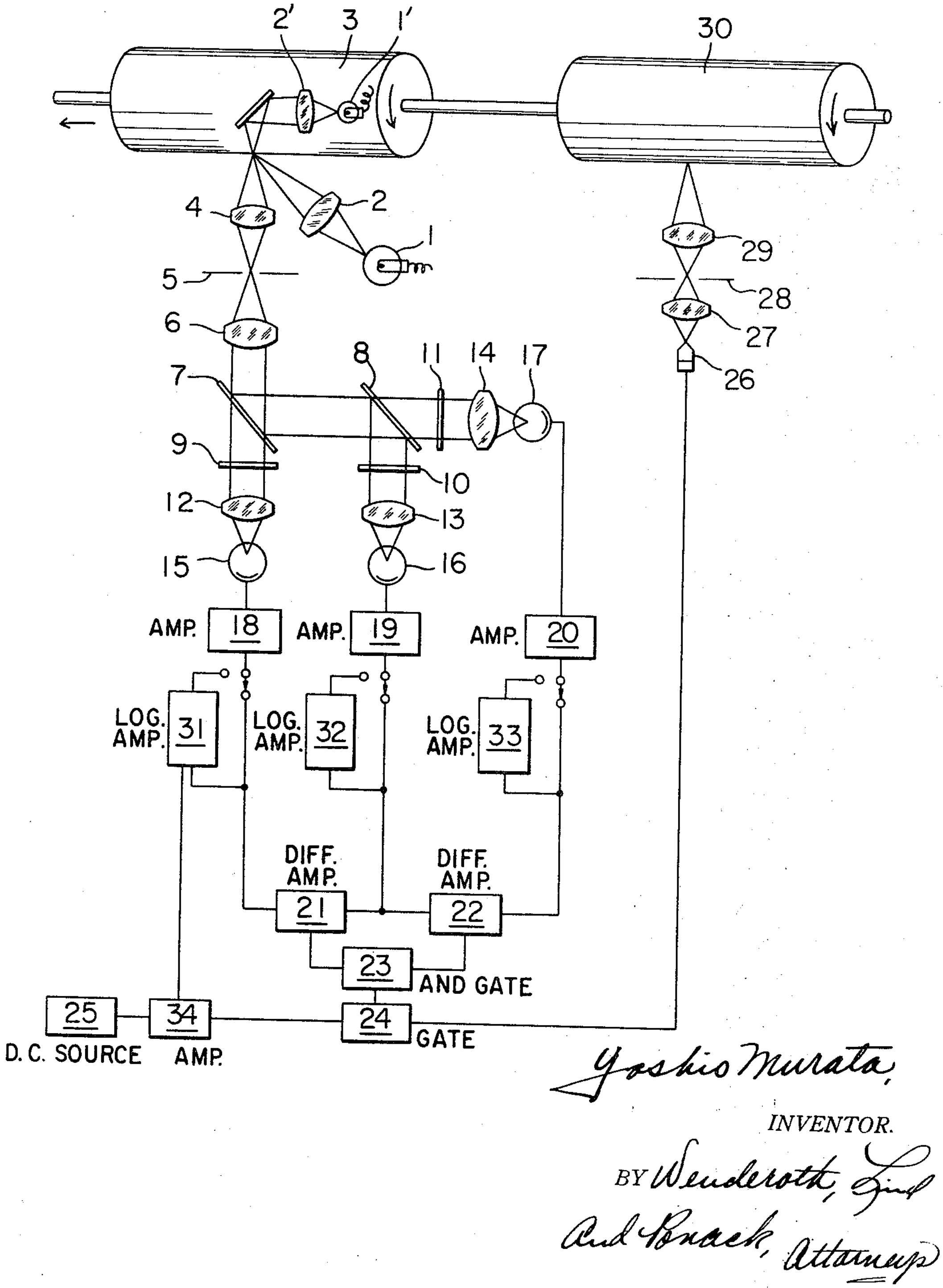
Yoshio Murata,
INVENTOR.
BY Wenderoth, Lind and Ponack, Attorneys United States Patent Office 3,529,078
Patented Sept. 15, 1970

3,529,078

OPTICAL SCANNING SYSTEM FOR TRANSFER OF SELECTED COLOR PATTERNS

Yoshio Murata, Suita-shi, Japan, assignor of one-half each to Dianippon Ink and Chemicals, Incorporated, Tokyo, Japan, a corporation of Japan, and Yoshio Murata, Osaka-fu, Japan Filed Feb. 13, 1967, Ser. No. 615,659
Claims priority, application Japan, Feb. 16, 1966, 41/8,803
Int. Cl. H04n *1/46, 9/10, 9/14*
U.S. Cl. 178—5.2 16 Claims

ABSTRACT OF THE DISCLOSURE

An image transfer system for transferring from a multicolor pattern that portion thereof consisting of only the color whose transfer is desired, said system comprising an optical separating means, a photoelectric transforming means, amplifiers, differential means, a gate and reproducing means.

In printing textile materials with prints of multicolor, the method being practiced is that wherein the printing of the pattern of several colors are carried out by printing the designs of each color separately. Thus, in printing an original pattern of multicolor, it is necessary to sort out the patterns by color. However, since this color sorting has heretofore been performed exclusively by human effort, the mechanization and automation of this step has been the greatest desire of the printing industry.

The object of this invention reisdes in the realization of the foregoing desire by the provision of a system whereby it becomes possible to transfer automatically from a manner pattern of multicolor the pattern of the color whose transfer is desired. It was found that the foregoing object could be attained by a system, as hereinafter described, whose principle comprises as follows: When the image receiving member is exposed to light from the color whose transfer is desired as minute areas of the original pattern are being successively scanned, the minute area of the image-receiving member in a position corresponding to that of the original pattern is either imparted a stimulus and forms a positive image or is not imparted a stimulus and forms a negative image.

Broadly speaking, this invention is carried out by using an apparatus comprising the following several means: an optical separating means *a* by which the colored high received from the original pattern is separated into the three primary colors as minute areas of the copy are being scanned successively; a photoelectric transforming means *b* by which the separated colors are transformed into their respective electric signals; amplifiers *c* for amplifying the respective electric signals which are received from the photoelectric transforming means; differential means *d* connected to each of the foregoing amplifiers and adapted to function when a difference occurs between at least one of the outputs of said amplifiers and that of the others; a gate *e* which opens or closes by the output of said differential means; and a reproducing means *f* which is operated by a power source means whose current is interrupted by means of said gate to impart stimuli to the image receiving member while scanning minute areas of said image receiving member successively.

More specifically speaking, this invention is directed to an image transfer system for transferring from a multicolor pattern that portion of the pattern consisting of the single color desired, the system being characterized in that is made up of:

(1) A roll for carrying on its surface the original pattern having the multicolor pattern to be transferred, the roll being so supported that it is rotatable as well as capable of shifting in the axial direction;

(2) A light source means for applying light to the original pattern disposed on the surface of said roll;

(3) An optical separation means for separating the light received from the original pattern into the three primary colors while scanning the original pattern disposed on the roll surface;

(4) Three photoelectric transforming means for transforming into electrical signals the three colored beams which have been separated by said optical means;

(5) Three amplifier means adjustable as to their amplification rate, which are for amplifying the three electrical signals received from said photoelectric transforming means, the amplifier means being so adapted that the amplification rates thereof are adjusted so that their respective outputs become equal when the electrical signals derived from the colors to be transferred are received;

(6) A differential means which operates when differences exist in the outputs of three amplifier means;

(7) A power source means which is switched in response to said differential means;

(8) A reproducing means connected with said power source means and which is for reproducing that portion of the pattern consisting of only the color whose transfer is desired; and (9) An image receiving roll which is so supported as to be capable of rotation as well as shifting in the axial direction synchronously with the first-named roll, and is adapted to receive an image of that portion of the pattern consisting of only the color whose transfer is desired by having its surface scanned and being imparted stimuli by said reproducing means.

The invention system is operated in the following original. First, a decision is made as to what colored pattern of a multicolor pattern is to be transferred (this color will be referred to herein as the specific color). The colored beam received from this specific color (specific color beam) is separated into its primary colors and the respective colored beams are transformed into electrical signals. On the other hand, the amplification rates of the amplifiers are adjusted so that their outputs will be equal when the electrical signals are received, while the differential means are adjusted so that they do not operate. Then when a positive image is desired, the reproducing means is set so that it is operated by the power source means when the differential means does not operate; whereas if a negative image is desired, the reproducing means set so that it is not operated by the power source means when the differential means does not operate. After completion of these preparatory operations, the original pattern is scanned by minute areas at a time, whereupon the differential means does not operate upon receiving the specific color beam from the original pattern but operates when it receives colored beams other than the specific color beam, with the consequence that the power source means is switched on or off in response thereto to start up or stop the operation of the reproducing means. Namely, when the image receiving member receives the specific color beam from the minute areas of the manner pattern, the minute areas of the image receiving member whose positions correspond are either imparted or not imparted stimuli, in consequence of which the specific color design portion of the manner pattern in automatically transferred as a positive or negative image.

The accompanying drawing is a schematic view illustrating an embodiment of this invention.

The invention will be described hereinafter with reference to this drawing.

Light from a light source 1 is rendered into intermittent light by means of a stroboscope, and this intermittent light is focused with a lens 2 at one point of the original pattern wrapped about a roll 3. Minute areas of the original pattern are then scanned by the light while rotating the roll 3 and shifting it in the axial direction. The reflected light received from the minute areas of the original pattern is caused to become parallel beams by means of lenses 4, 6 and a pinhole 5 and these parallel beams are separated into the three primary color beams by the optical separation means. For example, after splitting and diverting the parallel beams in three directions with semi-transparent-mirrors 7, 8, the split light is separated into the three primary colors of blue, green and red by the three color filters 9, 10, 11 used for indirect separation. Next, the separated colored beams are focused at photoelectric transforming means (e.g. photomultiplier tube) 15, 16, 17 by means of lenses 12, 13, 14. The colored beams which have been separated into the three primary colors are transformed into electric signals by the photoelectric transforming means and thereafter the electric signals are amplified by amplifier means (e.g. a combination of an AC amplifier a rectifier and an attenuator or a combination of a DC amplifier and an attenuator) 18, 19, 20 whose amplification rate is adjustable. These amplifier means, as previously noted, must be those whose amplification rates have been adjusted in advance so that their outputs will be the same when they receive the specific colored beams from the original pattern. Next, the outputs of the foregoing amplifiers are paired optionally and conducted to two differential means (e.g. differential amplifier, differential relay or AC or DC bridge circuit) 21, 22. These two differential means 21, 22 are connected to gate-operating means 23 (and gate circuit) which is connected to a gate 24 which, in turn, is connected in a circuit which connects a reproducing means (glow tube) 26 with a power source means (commercially available power source means) 25. If the gate 24 is set so as to open when there is no difference between the outputs of the aforesaid three amplifiers, i.e., when the differential means 21, 22 do not operate, the reproducing means 26 operates (the glow tube lights up) when a specific colored light is received from the original pattern. Finally, an image receiving roll 30 of identical size as that of the roll 3 is wrapped with an image receiving member (e.g. a sensitive film) of identical size as that of the original pattern, and the beam emitted by the glow tube 26 is focused at one point on the sensitive film via lenses 27, 29 and a pinhole 28, while the image receiving roll 30 is caused to move synchronously with the roll 3. Thus in this original, minute areas of the sensitive film are exposed when a specific colored beam is received from corresponding minute areas of an original pattern, thereby making it possible to transfer a specific color pattern portion from the multicolor original pattern to the sensitive film.

The foregoing description being an illustration of only one mode of the method of sorting colors of a multiclor pattern according to this invention, various other modes are possible.

For instance, as the light source means, either a continuous or intermittent light source means will do, if being possible to utilize such as a glow tube, strobo-discharge tube, etc. Transmitted light can also be utilized as the light to be received from the original pattern. In this case, the color film can be wrapped about a hollow roll 3 whose roll surface consists of a thin transparent wall and light can be applied to the minute areas of the original pattern from a light source 1' disposed in the interior of the roll via lens 2' and the transparent wall to emit transmitted light which may be utilized.

The optical separation means consisting of a combination of a semi-transparent-mirror and filter, as hereinbefore described, can be replaced by, say, an interference filter. Alternatively, a suitable combination of a lens system, pinhole, etc., may also be employed.

As the photoelectric transforming means, a photoelectric tube, photoresistor, phototransistor, photocell, photoconductive cell, etc., may be used instead of the aforesaid photomultiplier. In the circuits following the optical transforming means, it is possible to insert, for example, an auxiliary amplifier, cathode follower amplifier, attenuator, rectifier, etc., as desired.

In general, it is more convenient to amplify an electric signal by means of an AC amplifier than a DC amplifier. But the AC amplifier necessitates a rectifier because of bad frequency response as compared with the DC amplifier.

As the reproducing means, either an electric etcher, arc etcher or strobo-discharge tube can be used instead of the aforesaid glow tube.

If an electric etcher or arc etcher is used as the reproducing means and a printing roll as the image receiving roll, a pattern portion of specific color can be etched on a printing roll. Besides those described, the image receiving roll can be one whose surface has been coated with a photosensitive material.

Further, according to this invention, if the minute area scanned of the image receiving member is reduced in size from that of the original pattern, it becomes possible to reproduce on the image receiving member a pattern portion of specific color in which the permetric portion has been slightly deleted. As the ratio between the two minute areas can be chosen suitably and precisely, if plates prepared on the basis of patterns obtained in this original are used and printing of multicolor patterns are carried out, nonprinted portions are formed between the several patterns of the print. Thus, it becomes possible to prevent completely the color mixture due to the blotting of printing paste and excessive white areas when the pattern has been cropped too much, as was the case frequently seen heretofore.

The original pattern may be one having or lacking tone. When it is desired to transfer an original pattern having a continuous tone, i.e., one of the same color but whose brightness varies, transmitted light is utilized, using color transparencies as the original pattern roll is employed, as previously described.

In general, when the color is the same but the brightness varies, the transmitted or reflected light received from the original pattern has different rates of transmission or reflection and does not vary in proportion to the variation in brightness. Hence, according to the principle stated previously, differences between the outputs of the amplifiers 18, 19 and 20 are set up, with the consequence that an original pattern having gradations in its tone cannot be transferred. However, since as in the case of liquids Beer's law, which state that $-\log_{10} T=KC$, where K is a constant, applies to all wavelengths ranging between the concentration (brightness) C and the transmittance T, holds good in the case of transmitted light of color transparencies, the tonal gradations of the original pattern can be transferred intact by conducting the outputs of the amplifiers 18, 19, 20 to logarithmic amplifiers 31, 32, 33 and then using outputs of the latter as inputs of the differential amplifiers 21, 22. In this case, it is desirable to give consideration to the matter of amplifying the voltage of the power source in accordance with the brightness of the original pattern by inserting in the power source circuit, which connects with the reproducing means 26, an amplifier 34 which operates in accordance with the outputs of the logarithmic amplifiers.

As is apparent from the description given hereinbefore, this invention not only is efficient in that it makes possible to perform the task of sorting by color in a very short period of time as compared with the conventional method which depended on human labor, but it also has the advantage that since the sorting operation is carried out by utilizing the colored light which is received when minute areas of the original pattern applied light, the sorting of even those fine patterns which were heretofore difficult to sort has been simplified.

I claim:

1. An image transfer system for transferring from a multicolor pattern that portion thereof consisting of only the color whose transfer is desired, said system comprising an image-carrying roll for carrying on its surface an original pattern having the multicolor pattern to be transferred and a separate image-receiving roll; means supporting said both of said rolls for synchronous rotatable and axially shifting movements; light source means for applying light to said original pattern which is disposed on the surface of said roll; optical separation means disposed to and for separating the light received from the original pattern into the three primary colors while scanning said roll-carried original pattern; electrical circuitry means including three photoelectric transforming means disposed for transforming into electrical signals the three colored beams which have been separated by said optical separation means; three amplifier means for respectively amplifying said three electrical signals received from said photoelectric transforming means; said circuitry and said amplifier means including means to adjust the amplification rate of said amplifier means, whereby said amplification rates thereof are adjusted so that their respective outputs become equal when the electrical signals derived from the color to be transferred are received; differential means including two differential amplifiers connected respectively between said three amplifier means, and gate means interconnected in the circuitry by gate-operating means; said differential means controls the operation of said gate-operating means by the difference of the outputs of the aforesaid three amplifier means; said gate-operating means operates said gate only when the outputs of each of said two differential amplifier means are zero; power source means connected to the circuitry with and being activated by the operation of said gate-operating means; reproducing means for reproducing that portion of the pattern consisting of only the color whose transfer is desired, said reproducing means including and connected with said power source means; said reproducing means also including the aforesaid image receiving roll and a lens system; said reproducing means further including means for scanning and imparting image-producing stimuli to said image receiving roll being adapted to receive as an image that portion of the pattern consisting of only the color whose transfer is desired.

2. A system as defined in claim 1 including means for producing intermittent rays to be used as said light source means and wherein said amplifier means include AC amplifiers.

3. A system as defined in claim 1 wherein said optical separation means includes combinations of a semi-transparent mirror and a filter.

4. A system as defined in claim 1 wherein said photoelectric transforming means includes a photomultiplier tube.

5. A system as defined in claim 1 wherein means producing continuous rays are used as said light means; and wherein DC amplifiers are used as said amplifier means.

6. A system as defined in claim 1 wherein a differential amplifier is used as said differential means.

7. A system as defined in claim 1 wherein a glow tube is used as a primary part of said reproducing means, and is connected with said power source via said gate.

8. A system as defined in claim 1 wherein said image-receiving roll is provided with a photosensitive surface.

9. An image transfer system for transferring from a continuous-tone multicolor pattern the continuous-tone portion thereof consisting of only the color whose transfer is desired, said system comprising a transparent hollow roll for carrying on its surface a transparent original pattern having the continuous-tone multicolor pattern to be transferred, in a separate image-receiving roll; means supporting said rolls both for synchronous rotatable and axially shifting movements; light source means for applying light from the interior of said roll to said original pattern which is disposed on the surface thereof; optical separation means disposed to and for separating the transmitted light received from the original pattern into the three primary colors while scanning said original pattern disposed on said transparent roll surface; electrical circuitry means including three circuits with three corresponding photoelectric transforming means disposed therein for transforming into electrical signals the three colored beams which have been separated by said optical separation means and ultimately connecting them with pattern reproducing means defined hereinafter; three amplifier means including at least one DC amplifier interposed in the respective circuits for respectively amplifying said three electrical signals received from said photoelectric transforming means; said circuit and amplifier means including means to adjust the amplification rate of said amplifier means; whereby said amplification rates thereof are adjusted so that their respective outputs become equal when the electrical signals derived from the colors to be transferred are received; three logarithmic amplifier means connected respectively with said three amplifier means in the respective circuits for effecting the logarithmic amplification of the respective electrical signal received from said three amplifier means; differential means including two differential amplifiers connected respectively between said three logarithmic amplifier means; and gate or switch means interconnected via gate-operating means between said differential means and pattern reproducing means of said circuitry; said differential means controls the operation of said gate and gate-operating means by the difference of the outputs of the aforementioned three logarithmic amplifier means; said gate or switch-operating means operating said gate or switch only when the outputs of each of said two differential amplifier means are zero; power service means comprising a DC amplifier connected with a logarithmic amplifier means, and connected to the circuitry with and being activated by operation of said gate-operating means; reproducing means for reproducing that portion of a continuous-tone pattern consisting of only the color whose transfer is desired; said reproducing means including and connected with said power source means, and also including the aforesaid image-receiving roll, a lens system, and means for scanning and imparting image-producing stimuli to said image receiving roll being adapted to receive as an image the continuous-tone pattern portion consisting of only the color desired.

10. A system as defined in claim 9 including means for producing intermittent rays to be used as said light source means and wherein said amplifier means include AC amplifiers.

11. A system as defined in claim 9 wherein said optical separation means includes combinations of a semi-transparent mirror and a filter.

12. A system as defined in claim 9 wherein said photoelectric transforming means includes a photomultiplier tube.

13. A system as defined in claim 9 wherein means producing continuous rays are used as said light means; and wherein DC amplifiers are used as said amplifier means.

14. A system as defined in claim 9 wherein a differential amplifier is used as said differential means.

15. A system as defined in claim 9 wherein a glow tube is used as a primary part of said reproducing means, and is connected with said power source via said gate.

16. A system as defined in claim 9 wherein said image-receiving roll is provided with a photosensitive surface.

References Cited

UNITED STATES PATENTS

| | | | |
|---|---|---|---|
| 3,120,577 | 2/1964 | Young | 178—6.7 |
| 3,210,552 | 10/1965 | Young | 250—226 |

ROBERT L. GRIFFIN, Primary Examiner

R. L. RICHARDSON, Assistant Examiner

U.S. Cl. X.R.

209—111.6; 250—226